(12) United States Patent
Yue (10) Patent No.: US 8,573,678 B2
(45) Date of Patent: Nov. 5, 2013

(54) TENSION CONTROL ASSEMBLY FOR FLEXIBLE TONNEAU COVER SYSTEM OF PICK-UP TRUCK

(75) Inventor: Shiawdar Shaun Yue, Cupertino, CA (US)

(73) Assignee: CYC Engineering, Inc., Fremont, CA (US)

( * ) Notice: Subject to any disclaimer, the term of this patent is extended or adjusted under 35 U.S.C. 154(b) by 118 days.

(21) Appl. No.: 13/196,893

(22) Filed: Aug. 3, 2011

(65) Prior Publication Data

US 2013/0033061 A1 Feb. 7, 2013

(51) Int. Cl.
B60P 7/04 (2006.01)
(52) U.S. Cl.
USPC .................................. 296/100.15; 296/100.18
(58) Field of Classification Search
USPC ............. 296/100.15, 100.16, 100.13, 100.11, 296/100.12, 100.01
See application file for complete search history.

(56) References Cited

U.S. PATENT DOCUMENTS

| 4,739,528 | A | * | 4/1988 | Allen ................................. 5/119 |
| 4,832,395 | A | * | 5/1989 | Lovaas ..................... 296/100.03 |
| 5,058,652 | A | * | 10/1991 | Wheatley et al. ............. 160/327 |
| 6,575,520 | B1 | | 6/2003 | Spencer |
| 6,811,203 | B2 | * | 11/2004 | Wheatley ................. 296/100.15 |
| 6,824,191 | B2 | * | 11/2004 | Wheatley ................. 296/100.17 |
| 6,893,073 | B2 | * | 5/2005 | Wheatley ................. 296/100.15 |
| 7,048,277 | B1 | * | 5/2006 | Schmeichel ............. 296/100.16 |

* cited by examiner

Primary Examiner — Glenn Dayoan
Assistant Examiner — Sunsurraye Westbrook (57) ABSTRACT

A tension control assembly for a flexible tonneau cover system of a pick-up truck has an adjustable engagement plate and a screw assembly. The adjustable engagement plate has an engagement hook to selectively engage in one of engagement holes formed on a side rail, and further has a positioning hole to position the screw assembly according to the engagement relationship between the engagement hook and the engagement holes, so that the adjustable engagement plate and the screw assembly can be used to adjust and stably keep a longitudinal position of a front header in relation to a length direction of the side rail, so as to prevent from causing vibration noise. Meanwhile, a transverse position of the front header in relation to a width direction of the side rail can be simultaneously adjusted during adjusting the longitudinal position of the front header.

14 Claims, 8 Drawing Sheets

TENSION CONTROL ASSEMBLY FOR FLEXIBLE TONNEAU COVER SYSTEM OF PICK-UP TRUCK

FIELD OF THE INVENTION

The present invention relates to a tension control assembly for a flexible tonneau cover system of a pick-up truck, and more particularly to a tension control assembly for a flexible tonneau cover system of a pick-up truck capable of adjusting the longitudinal and transverse installation relationship between a front header and a side rail.

BACKGROUND OF THE INVENTION

Traditionally, a flexible cover can be used to cover a cargo bed of a pick-up truck for protecting the cargos stored in the cargo bed. The flexible cover can be made of fabric, flexible plastic, or other sheet material, such as canvas, vinyl plastic or other weather-resistant fabric. The flexible cover is commonly secured to a metal frame on the edge of the cargo bed by means of reversible attachment. Because the pick-up truck generally are used and stored outdoors, the fabric cover and the reversible attachment means to the metal frame are exposed to the moisture, extreme heat and cold, dust, mud, rocks and other external material transported in the cargo bed. The exposure to the external material causes problems for the covering and the structure used to reversibly attach the flexible cover to the metal frame.

Figure 1:
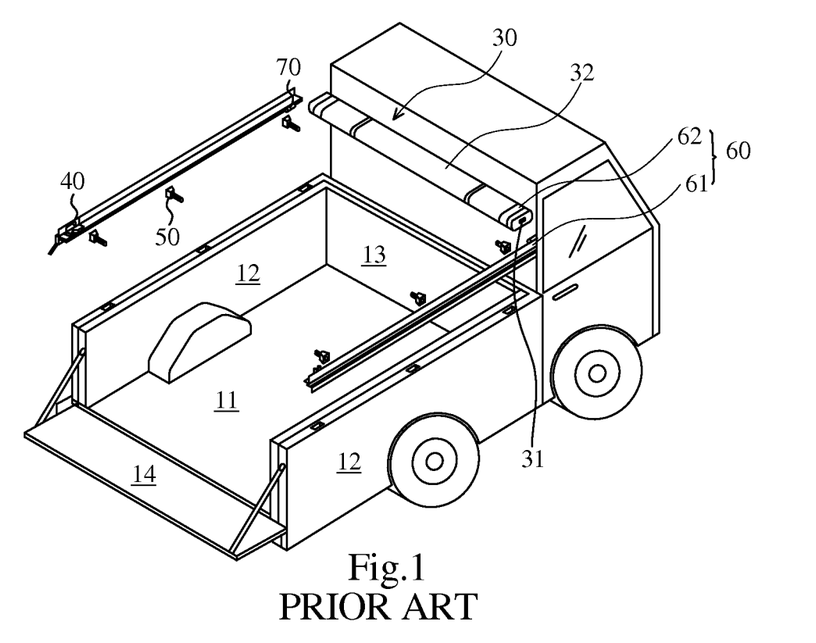
FIG. 1 is an exploded perspective view of a traditional flexible tonneau cover system of a pick-up truck.
Figure 2:
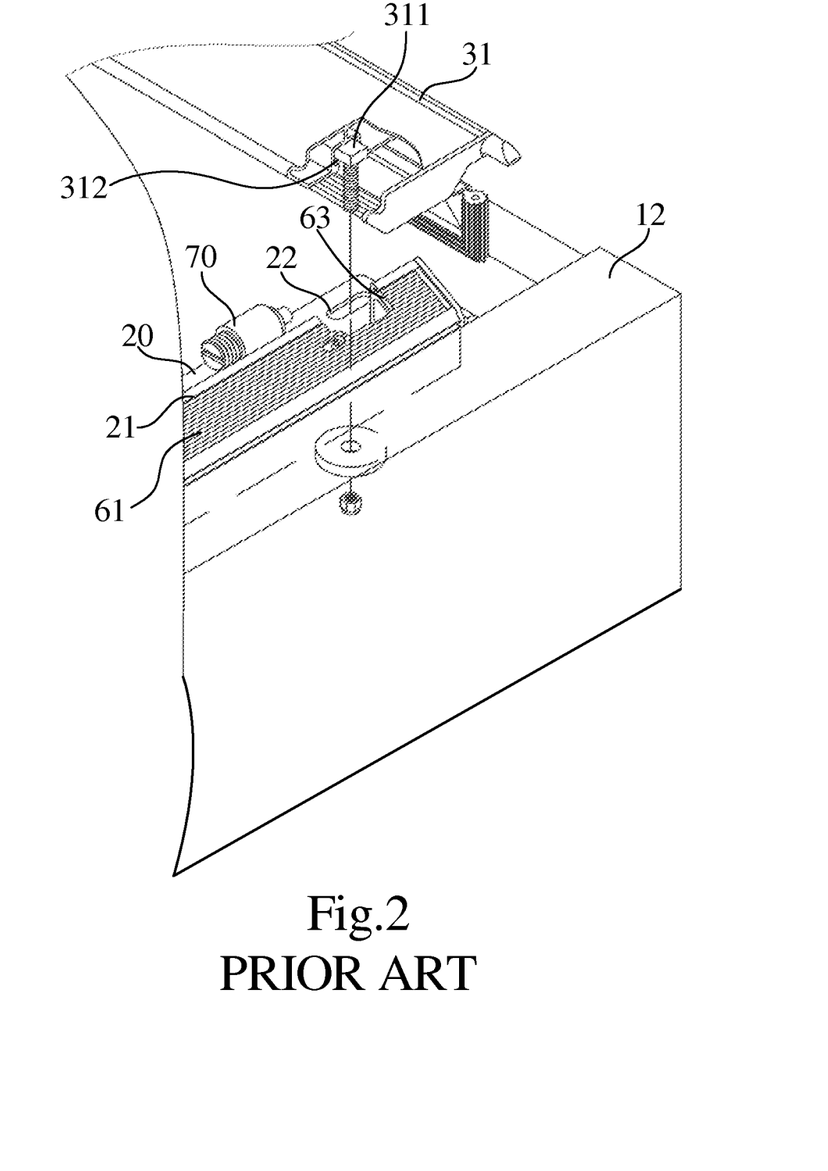
FIG. 2 is a partially enlarged view of a tension control assembly for the traditional flexible tonneau cover system.
Figure 3:
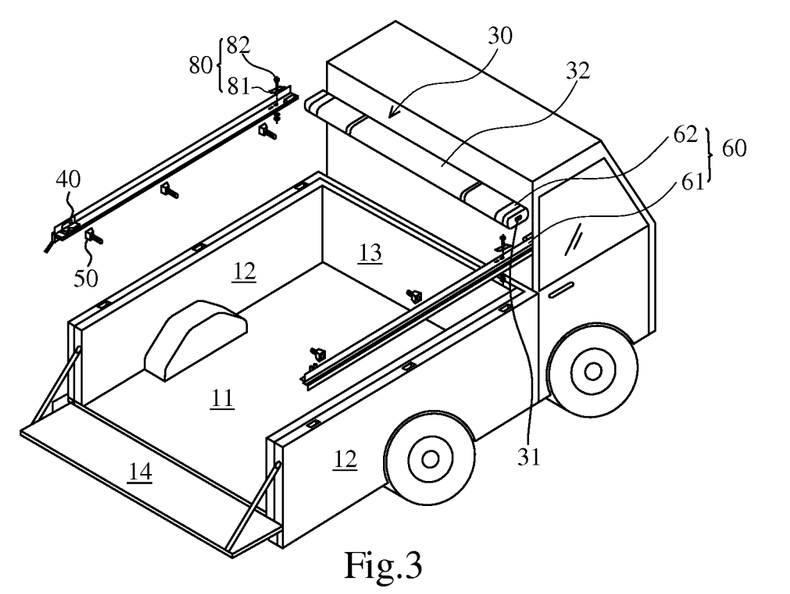
FIG. 3 is an exploded perspective view of a flexible tonneau cover system of a pick-up truck according to a first embodiment of the present invention.

For solving the foregoing problem, please refer now to FIGS. 1, 2 and 3, U.S. Pat. No. 6,575,520 discloses a traditional flexible tonneau cover system of a pick-up truck, wherein the flexible tonneau cover system is installed on a cargo bed 11 of a pick-up truck 10, and the flexible tonneau cover system comprises a pair of side rails 20, a flexible cover assembly 30, a rear header guide 40, a plurality of clamps 50, two hook-and-loop fastening assemblies 60 and a pair of tension control assemblies 70. The two side rails 20 are mounted on the top of two side walls 12 of the cargo bed 11 by the clamps 50; the flexible cover assembly 30 is mounted above a front wall 13 of the cargo bed 11; and the rear header guide 40 is mounted on the rear end of the two side rails 20 close to a tailgate 14 of the pick-up truck 10. The flexible cover assembly 30 has a front header 31, a flexible cover material 32 and a rear header (not-shown), wherein each end of the front header 31 has a screw member 311, wherein the screw member 311 has a head portion slidably installed in a groove 312 of the front header 31 and a thread rod portion installed in an oval-shaped hole 22 of the front end of the two side rails 20; the flexible cover material 32 can be rolled up on the front header 31 or be unrolled rearward on the two side rails 20 to cover the cargo bed 11; and the rear header can be engaged with or separated from the rear header guide 40. Each of the two hook-and-loop fastening assemblies 60 has a first fastener 61 and a second fastener 62. The first fastener 61 is attached to an elongated slat 63 by adhesives, chemical bonding, thermal fusion, or the like, wherein the elongated slat 63 is slidably inserted in a channel portion 21 of the side rail 20. Meanwhile, the second fastener 62 is attached to the flexible cover material 32 by stitching, adhesives, chemical bonding, fusion, and the like. The tension control assemblies 70 are fixed on the front end of the two side rails 20.

When the flexible cover material 32 is unrolled rearward on the two side rails 20 to cover the cargo bed 11, the first fastener 61 and the second fastener 62 can be engaged with each other to provide a weatherproof seal without gaps that will protect the cargos in the cargo bed 11 from rain, wind, and blowing debris. At the same time, the tension control assembly 70 is used to automatically control the tension of the flexible cover material 32 by elastic bias of a spring plunger therein or manually adjust the tension thereof by a user, wherein the front header 31 will shift either slightly forward or slightly back, so as to achieve the desired tension. The tension can be adjusted to accommodate expansion or contraction of the flexible cover material 32 in response to climatic conditions. When the flexible cover material 32 is slightly shifted forward or backward, the combination of the second fastener 62, the first fastener 61 and the elongated slat 63 is slid along the channel portion 21 of the side rail 20 for carrying out the corresponding position adjustment.

However, there are still problems existing in the actual use of the traditional flexible tonneau cover system, as follows: although the spring plunger of the tension control assembly 70 automatically pushes the front header 31 to control the tension of the flexible cover material 32, the extension degree of the spring plunger is limited. After long-term use, the length of the flexible cover material 32 may be permanently lengthened due to the elastic fatigue caused by the elastic bias of the spring plunger. Thus, the length of the flexible cover material 32 may be greater than the maximum extension degree of the spring plunger, so that the spring plunger can not stably abut against and hold the front header 31 and there will be a vibration noise problem generated between the front header 31 and the side rail 20 due to unstable installation. If the weather is too hot and the flexible cover material 32 is expanded too much, there will also be the vibration noise problem. On the other hand, the cost of the tension control assembly 70 is relatively high, and thus it is not advantageous to lower the price of the whole flexible tonneau cover system.

As a result, it is necessary to provide a tension control assembly for a flexible tonneau cover system of a pick-up truck to solve the problems existing in the conventional technologies, as described above.

SUMMARY OF THE INVENTION

A primary object of the present invention is to provide a tension control assembly for a flexible tonneau cover system of a pick-up truck, which is provided with an adjustable engagement plate and a screw assembly, the adjustable engagement plate has an engagement hook to selectively engage in one of engagement holes formed on a side rail and further has a positioning hole to position the screw assembly according to the engagement relationship between the engagement hook and the engagement holes, so that the adjustable engagement plate and the screw assembly can be used to adjust and stably keep a longitudinal position of a front header in relation to a length direction of the side rail, so as to prevent from causing vibration noise.

A secondary object of the present invention is to provide a tension control assembly for a flexible tonneau cover system of a pick-up truck, wherein the screw assembly has a screw member and a nut member, the screw member is formed with a head portion and a thread rod portion, the head portion is slidably installed in a groove of the front header, the thread rod portion passes through the positioning hole of the adjustable engagement plate and an oval-shaped hole on a front end of the side rail in turn to screw-connect with the nut member, so that a transverse position of the front header in relation to a width direction of the side rail can be simultaneously adjusted during adjusting the longitudinal position of the front header.

A third object of the present invention is to provide a tension control assembly for a flexible tonneau cover system of a pick-up truck, wherein the structures of the adjustable engagement plate and the screw assembly are relatively simple, so that it is advantageous to lower the price of the whole flexible tonneau cover system.

To achieve the above object, the present invention provides a tension control assembly for a flexible tonneau cover system of a pick-up truck, wherein the tension control assembly is installed between a front end of a side rail and one end of a front header, and the tension control assembly comprises:

an adjustable engagement plate sandwiched between the front header and the side rail, and having a positioning hole and an engagement hook to selectively engage in one of engagement holes formed on the front end of the side rail; and a screw assembly having a screw member and a nut member, wherein the screw member is formed with a head portion and a thread rod portion, the head portion is slidably installed in a groove of the front header, the thread rod portion passes through the positioning hole of the adjustable engagement plate and an oval-shaped hole on the front end of the side rail in turn to screw-connect with the nut member, so that a transverse position of the front header in relation to a width direction of the side rail is adjusted and stably kept, while the positioning hole of the adjustable engagement plate positions the thread rod portion of the screw assembly according to an engagement relationship between the engagement hook and the engagement holes, so that a longitudinal position of the front header in relation to a length direction of the side rail is adjusted and stably kept.

Furthermore, the present invention provides another tension control assembly for a flexible tonneau cover system of a pick-up truck, wherein the tension control assembly is installed between one end of a side rail and one end of a header, and the tension control assembly comprises:

an adjustable engagement plate sandwiched between the header and the side rail, and having a positioning hole and an engagement hook to selectively engage in one of engagement holes formed on the end of the side rail; and a screw assembly having a screw member and a nut member, wherein the screw member is formed with a head portion and a thread rod portion, the head portion is slidably installed in a groove of the header, the thread rod portion passes through the positioning hole of the adjustable engagement plate and an oval-shaped hole on the end of the side rail in turn to screw-connect with the nut member, so that a transverse position of the header in relation to a width direction of the side rail is adjusted and stably kept, while the positioning hole of the adjustable engagement plate positions the thread rod portion of the screw assembly according to an engagement relationship between the engagement hook and the engagement holes, so that a longitudinal position of the header in relation to a length direction of the side rail is adjusted and stably kept.

In one embodiment of the present invention, the engagement hook of the adjustable engagement plate is a bent hook.

In one embodiment of the present invention, the adjustable engagement plate is a one-piece punched metal plate.

In one embodiment of the present invention, the adjustable engagement plate includes: a first metal plate having the engagement hook and a narrow-mouth hole; a second metal plate having the positioning hole and an expanded end portion; and a spring inserted in the narrow-mouth hole and biasing against the expanded end portion of the second metal plate.

In one embodiment of the present invention, the screw assembly further has a washer, wherein the washer is sandwiched between the adjustable engagement plate and the nut member, and the thread rod portion passes through an opening of the washer.

In one embodiment of the present invention, the number of the engagement holes formed on the front end of the side rail is three or more.

In one embodiment of the present invention, the engagement holes and the oval-shaped hole are formed on a front end of an inward extension plate of the side rail.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 4:
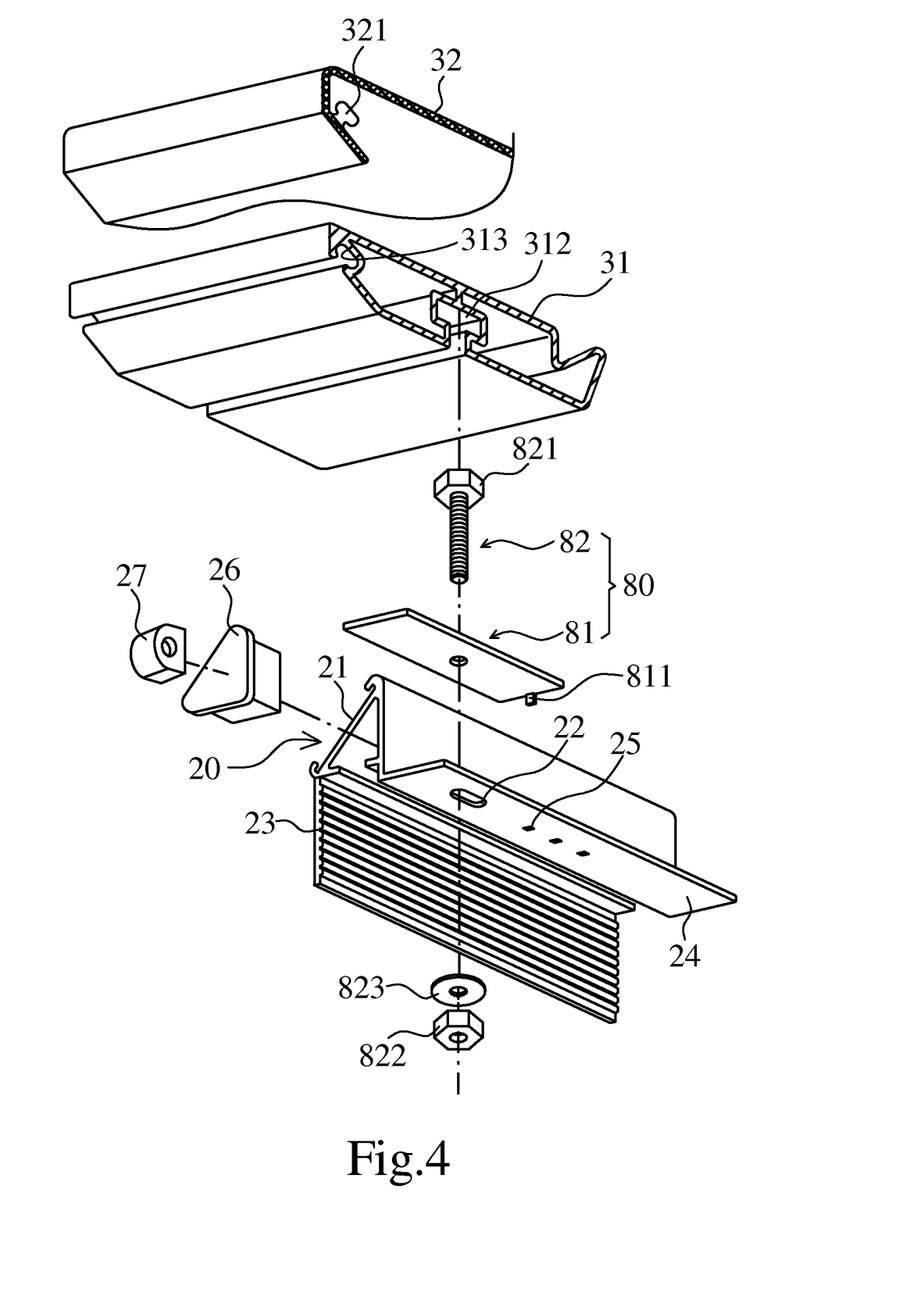
FIG. 4 is a partially enlarged view of a tension control assembly for the flexible tonneau cover system before installation according to the first embodiment of the present invention, wherein the tension control assembly is the right one shown in FIG. 3 based on a view angle from left to right.
Figure 5:
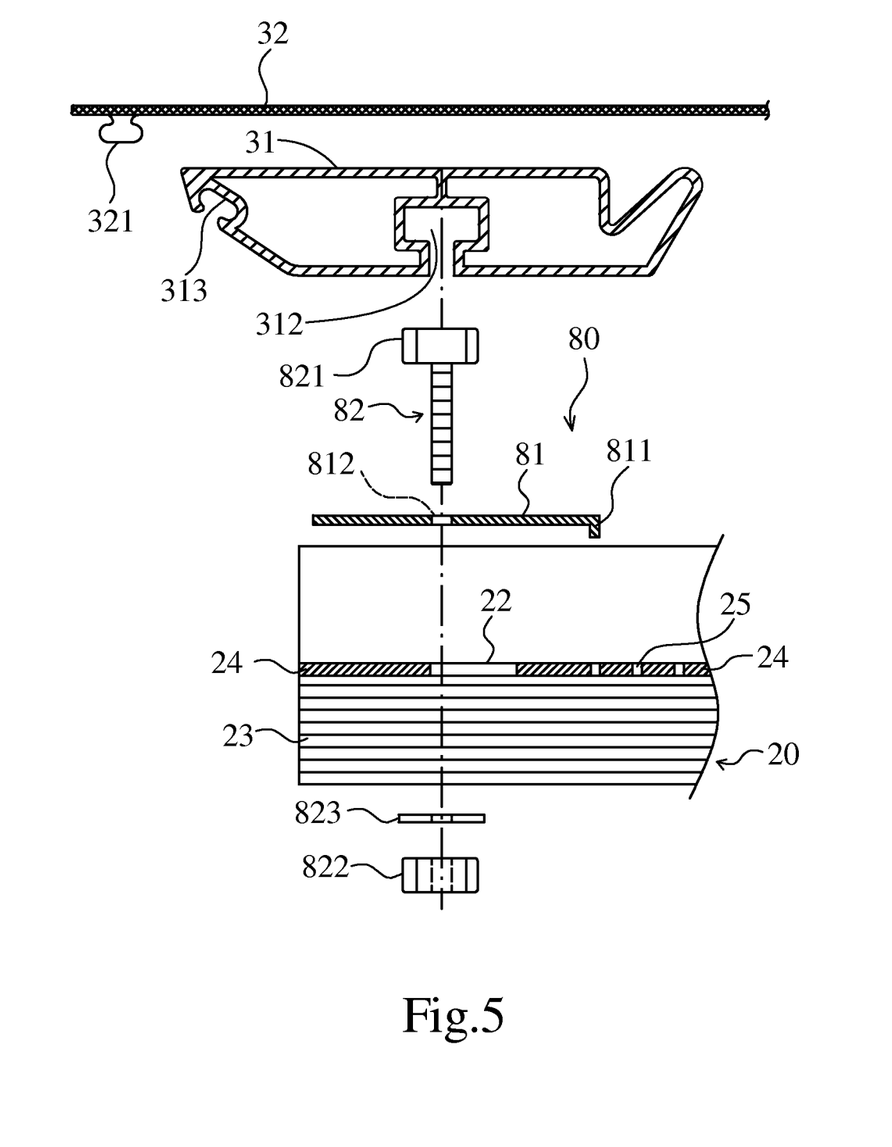
FIG. 5 is a cross-sectional view of the tension control assembly in FIG. 4.
Figure 6:
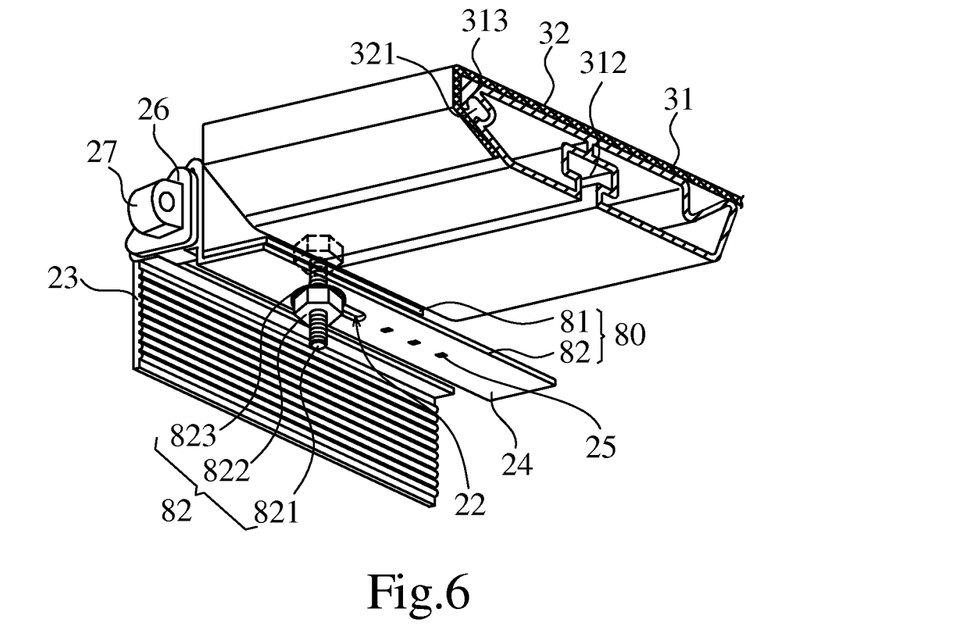
FIG. 6 is a partially enlarged view of the tension control assembly after installation according to the first embodiment of the present invention.
Figure 7:
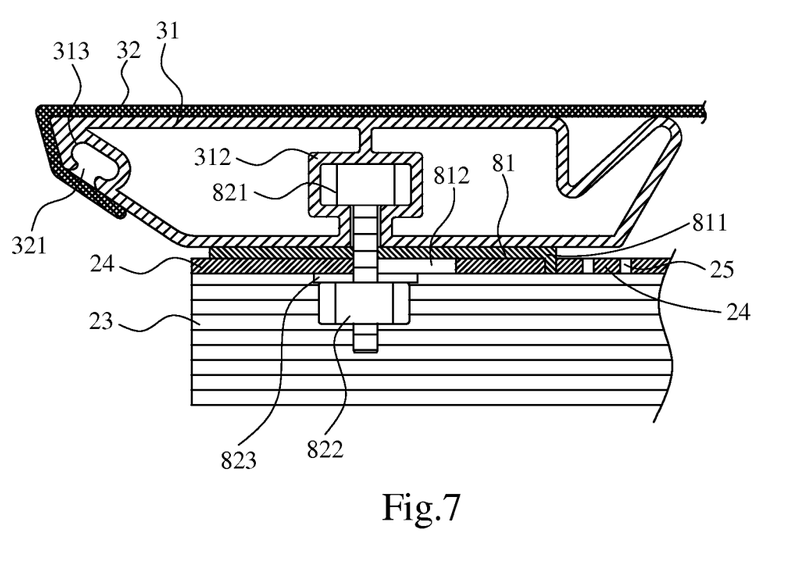
FIG. 7 is a cross-sectional view of the tension control assembly in FIG. 6.

Referring now to FIGS. 3, 4 and 5, a flexible tonneau cover system of a pick-up truck according to a first embodiment of the present invention is illustrated. As shown, As shown, a flexible tonneau cover system is installed on a cargo bed 11 of a pick-up truck 10, and the flexible tonneau cover system comprises a pair of side rails 20, a flexible cover assembly 30, a rear header guide 40, a plurality of clamps 50, two side fastening assemblies 60 and two tension control assemblies 80, wherein the side rails 20, the flexible cover assembly 30, the rear header guide 40, the clamps 50 and the two side fastening assemblies 60 are similar to that of the traditional flexible tonneau cover system, as shown in FIGS. 1 to 2.

Referring to FIGS. 3, 4 and 5, in the first embodiment of the present invention, the two side rails 20 are mounted on the top of two side walls 12 of the cargo bed 11 by the clamps 50. The flexible cover assembly 30 is mounted above a front wall 13 of the cargo bed 11. The rear header guide 40 is mounted on rear end of the two side rails 20 close to a tailgate 14 of the pick-up truck 10. The flexible cover assembly 30 has a front header 31, a flexible cover material 32 and a rear header (not-shown), wherein two ends of the front header 31 is adjustably installed on the front end of the two side rails 20 by the tension control assembly 80. The flexible cover material 32 has an insertion rod 321 provided on a front edge thereof, while the front header 31 has an insertion groove 313 formed on a front edge thereof, wherein the insertion rod 321 of the flexible cover material 32 can be inserted into the insertion groove 313 of the front header 31, so that the flexible cover material 32 can be connected to the front header 31 and rolled up on the front header 31. Alternatively, the flexible cover material 32 also can be unrolled rearward on the two side rails 20 to cover the cargo bed 11 by the two side fastening assemblies 60. The rear header can be engaged with or separated from the rear header guide 40.

Furthermore, referring to FIGS. 3, 4 and 5, in the first embodiment of the present invention, each of the two side fastening assemblies 60 has a first fastener 61 and a second fastener 62. The first fastener 61 is attached to an elongated slat (not-shown) which is slidably inserted in a channel portion 21 of the side rail 20. Meanwhile, the second fastener 62 is attached to the flexible cover material 32 by stitching, adhesives, chemical bonding, fusion, and the like. Furthermore, the tension control assemblies 80 are fixed on the front end of the two side rails 20, wherein the tension control assembly 80 is used to manually control the tension of the flexible cover material 32 through the front header 31, wherein the front header 31 will shift either slightly forward or backward, so as to achieve the desired tension, while the front header 31 will shift either slightly leftward or rightward. Thus, the tension control assembly 80 can accommodate expansion or contraction of the flexible cover material 32 in response to climatic conditions.

Furthermore, referring to FIGS. 3, 4, 5, 6 and 7, in the first embodiment of the present invention, each of the side rails 20 is formed with a channel portion 21 formed on a triangular frame thereof, a side mounting plate 23 clamped by the clamp 50, an inward extension plate 24 formed with an oval-shaped hole 22 and a plurality of engagement holes 25, an end cap 26 mounted on a front end of the side rail 20, and a soft protective strip 27 made of synthetic sponge or equivalent material, wherein the oval-shaped hole 22 is formed close to the front end of the inward extension plate 24 of the side rail 20, and the engagement holes 25 are formed close to the oval-shaped hole 22 and slightly far away from the front end thereof. The number of the engagement holes 25 can be three or more. In FIG. 4, the inward extension plate 24 of the side rail 20 is formed with three engagement holes 25, wherein each of the engagement holes 25 is a small square or rectangular through hole, and all of the engagement holes 25 are arranged in a row along a length direction of the inward extension plate 24 of the side rail 20. The oval-shaped hole 22 is also extended along the length direction of the inward extension plate 24. In addition, the front header 31 is formed with a groove 312, wherein the groove 312 is extended between two ends of the front header 31, and has a narrow slot and a wider inner space.

Meanwhile, referring to FIGS. 3 to 7, in the first embodiment of the present invention, each of the tension control assemblies 80 has an adjustable engagement plate 81 and a screw assembly 82. The adjustable engagement plate 81 is preferably a one-piece punched metal plate, but not limited thereto. The adjustable engagement plate 81 has an engagement hook 811 formed on a rear edge thereof and a positioning hole 812 formed on a position close to a front edge thereof, wherein the engagement hook 811 is preferably a bent hook formed by punching, and the positioning hole 812 is preferably a circular through hole. In installation, the adjustable engagement plate 81 is sandwiched between a lower surface of the front header 31 and an upper surface of the inward extension plate 24 of the side rail 20, and then the engagement hook 811 can be used to selectively engage in one of engagement holes 25 formed on the front end of the inward extension plate 24 of the side rail 20.

Referring to FIGS. 3 to 7 again, in the first embodiment of the present invention, the screw assembly 82 has a screw member 821, a nut member 822 and a washer 823, wherein the screw member 821 is formed with a head portion and a thread rod portion (unlabeled). The head portion of the screw member 821 can be square or hexagonal and be slidably installed in the groove 312 of the front header 31. The thread rod portion of the screw member 821 has an outer thread and can pass through the positioning hole 812 of the adjustable engagement plate 81, the oval-shaped hole 22 on the front end of the inward extension plate 24 of the side rail 20 and an opening of the washer 823 in turn for screw-connecting with the nut member 822. The nut member 822 can be square or hexagonal, and have an inner thread for be matched with the outer thread of the thread rod portion of the screw member 821. The washer 823 is sandwiched between the adjustable engagement plate 81 and the nut member 822, for protecting the lower surface of the inward extension plate 24 of the side rail 20 from be damaged during tightening the nut member 822.

Referring to FIGS. 4 to 7, in the first embodiment of the present invention, when installing the front header 31 onto the side rail 20, the head portion of the screw member 821 is slidably pre-installed in the groove 312 of the front header 31, the adjustable engagement plate 81 is sandwiched between the lower surface of the front header 31 and the upper surface of the inward extension plate 24 of the side rail 20, and then the thread rod portion of the screw member 821 pass through the positioning hole 812 of the adjustable engagement plate 81, the oval-shaped hole 22 on the front end of the inward extension plate 24 of the side rail 20 and the opening of the washer 823 in turn. After this, a user uses a tool (such as a screw driver) to rotate and tighten the nut member 822, and thus the nut member 822 can be screw-connected with the thread rod portion of the screw member 821.

During screw-connection operation, the engagement hook 811 can selectively engage into one of the engagement holes 25 formed on the front end of the inward extension plate 24 of the side rail 20 according to climatic conditions and the degree of expansion/contraction of the flexible cover material 32. Thus, the positioning hole 812 of the adjustable engagement plate 81 can position the thread rod portion of the screw member 821 of the screw assembly 82 (i.e. guide and move the thread rod portion of the screw member 821 forward or rearward to a suitable position) according to an engagement relationship between the engagement hook 811 and the engagement holes 25. As a result, the front header 31 will shift either slightly forward or backward by the thread rod portion of the screw member 821 to achieve the desired tension, and a longitudinal position of the front header 31 in relation to a length direction of the inward extension plate 24 of the side rail 20 can be adjusted and stably kept by the nut member 822, so as to maintain a suitable tight and installation between the front header 31 and the two side rails 20 and prevent from causing vibration noise therebetween.

Meanwhile, the front header 31 will shift either slightly leftward or rightward in relation to the thread rod portion of the screw member 821 during screw-connection operation, so that a transverse position of the front header 31 in relation to a width direction of the inward extension plate 24 of the side rail 20 is simultaneously adjusted and stably kept due to the sliding movement of the head portion of the screw member 821 along the groove 312 of the front header 31. After finishing the tight installation of the nut member 822 and the thread rod portion of the screw member 821, the head portion of the screw member 821 can not slide along the groove 312 of the front header 31 again.

Once the climatic conditions are changed to affect the degree of expansion/contraction conditions of the flexible cover material 32, the user can use the tool to loosen the nut member 822. Thus, the engagement hook 811 can separate from the original engaged engagement hole 25 and selectively engage into another of the engagement holes 25 on the inward extension plate 24 of the side rail 20, in order to create a new tight and stable installation relationship between the front header 31 and the two side rails 20 in relation to the length direction of the inward extension plate 24 of the side rail 20. On the other hand, during this screw-connection operation, the transverse position of the front header 31 in relation to the width direction of the inward extension plate 24 of the side rail 20 is also simultaneously adjusted due to the sliding movement of the head portion of the screw member 821 along the groove 312 of the front header 31. Thus, the tension control assembly 80 can accommodate expansion or contraction of the flexible cover material 32 in the length and width directions in response to climatic conditions.

It should be noted that the tension control assembly 80 of the first embodiment is installed between the front end of the side rail 20 and a left/right end of the front header 31, but the tension control assembly 80 of the first embodiment also can be installed between a rear end of the side rail 20 and a left/right end of a rear header (not-shown).

Figure 8:
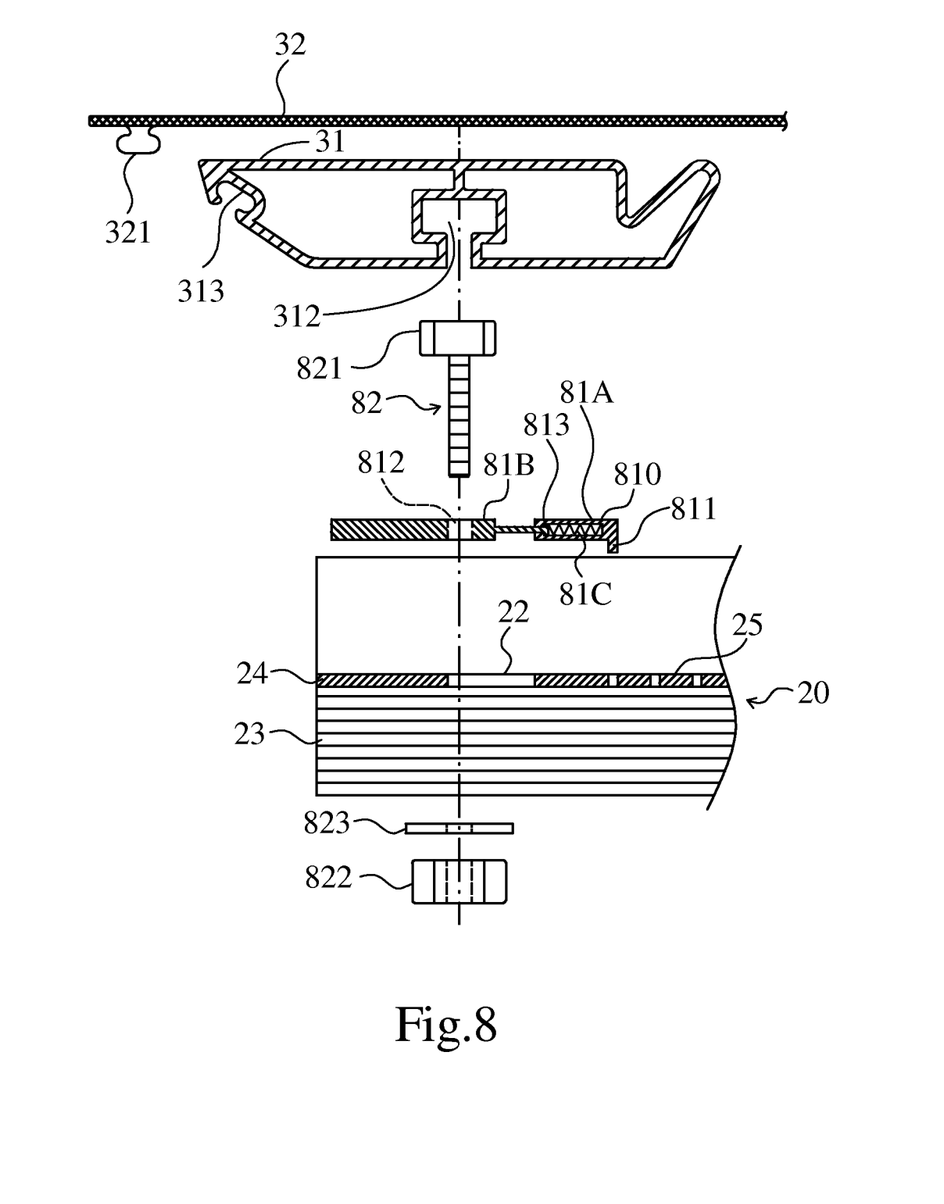
FIG. 8 is a cross-sectional view of a tension control assembly according to a second embodiment of the present invention.

Referring now to FIG. 8, a tension control assembly for a flexible tonneau cover system of a pick-up truck according to a second embodiment of the present invention is illustrated and similar to the first embodiment, so that the second embodiment uses similar terms or numerals of the first embodiment. As shown, the difference of the second embodiment is that the adjustable engagement plate 81 of the tension control assembly 80 further includes: a first metal plate 81A, a second metal plate 81B and a spring 81C, wherein the first metal plate 81A has the engagement hook 811 bent from a rear edge thereof and a narrow-mouth hole 810 formed on a front edge thereof. The second metal plate 81B has the positioning hole 812 formed on a position close to a front edge thereof and an expanded end portion 813 extended outward from a rear edge thereof, wherein the expanded end portion 813 has a width greater than that of an opening of the narrow-mouth hole 810. The spring 81C is inserted in the narrow-mouth hole 810 and can bias against the expanded end portion 813 of the second metal plate 81B and an inner rear surface of the narrow-mouth hole 810. Therefore, not only the longitudinal position of the adjustable engagement plate 81 can be adjusted by the engagement relationship between the engagement hook 811 and the engagement holes 25, but also the spring 81C can provide an additional bias to abut against the expanded end portion 813 of the second metal plate 81B, i.e. the thread rod portion of the screw member 821 and the front header 31 will be indirectly pushed forward to maintain better stable installation with the inward extension plate 24 of the side rail 20.

As described above, in comparison with the tension control assemblies 70 of the traditional flexible tonneau cover system of a pick-up truck which easily generates vibration noise problem between the front header 31 and the side rail 20 due to unstable installation, the tension control assembly for a flexible tonneau cover system of a pick-up truck of the present invention as shown in FIGS. 3 to 8 is provided with the adjustable engagement plate 81 and the screw assembly 82, the adjustable engagement plate 81 has the engagement hook 811 to selectively engage in one of engagement holes 25 formed on the side rail 20 and further has the positioning hole 812 to position the screw assembly 82 according to the engagement relationship between the engagement hook 811 and the engagement holes 25, so that the adjustable engagement plate 81 and the screw assembly 82 can be used to adjust and stably keep a longitudinal position of the front header 31 in relation to a length direction of the side rail 20, so as to prevent from causing vibration noise.

Furthermore, the screw assembly 82 has the screw member 821 and the nut member 822, the screw member 821 is formed with the head portion and the thread rod portion, the head portion is slidably installed in the groove 812 of the front header 31, the thread rod portion passes through the positioning hole 812 of the adjustable engagement plate 81 and the oval-shaped hole 22 on the front end of the side rail 20 in turn to screw-connect with the nut member 822, so that a transverse position of the front header 31 in relation to a width direction of the side rail 20 can be simultaneously adjusted during adjusting the longitudinal position of the front header 31. In addition, the structures of the adjustable engagement plate 81 and the screw assembly 82 are relatively simple, so that it is advantageous to lower the price of the whole flexible tonneau cover system.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A tension control assembly for a flexible tonneau cover system of a pick-up truck, being installed between a front end of a side rail and one end of a front header, and comprising:
   an adjustable engagement plate sandwiched between the front header and the side rail, and having a positioning hole and an engagement hook to selectively engage in one of engagement holes formed on the front end of the side rail, wherein the engagement hook is formed on a rear edge of the adjustable engagement plate and the positioning hole is formed on a position close to a front edge of the adjustable engagement plate; and
   a screw assembly having a screw member and a nut member, wherein the screw member is formed with a head portion and a thread rod portion, the head portion is slidably installed in a groove of the front header, the thread rod portion passes through the positioning hole of the adjustable engagement plate and an oval-shaped hole on the front end of the side rail in turn to screw-connect with the nut member, so that a transverse position of the front header in relation to a width direction of the side rail is adjusted and stably kept, while the positioning hole of the adjustable engagement plate positions the thread rod portion of the screw assembly according to an engagement relationship between the engagement hook and the engagement holes, so that a longitudinal position of the front header in relation to a length direction of the side rail is adjusted and stably kept.

2. The tension control assembly for a flexible tonneau cover system of a pick-up truck according to claim 1, wherein the engagement hook of the adjustable engagement plate is a bent hook.

3. The tension control assembly for a flexible tonneau cover system of a pick-up truck according to claim 1, wherein the adjustable engagement plate is a one-piece punched metal plate.

4. The tension control assembly for a flexible tonneau cover system of a pick-up truck according to claim 1, wherein the adjustable engagement plate includes: a first metal plate having the engagement hook and a narrow-mouth hole; a second metal plate having the positioning hole and an expanded end portion; and a spring inserted in the narrow-mouth hole and biasing against the expanded end portion of the second metal plate.

5. The tension control assembly for a flexible tonneau cover system of a pick-up truck according to claim 1, wherein the screw assembly further has a washer, wherein the washer is sandwiched between the adjustable engagement plate and the nut member, and the thread rod portion passes through an opening of the washer.

6. The tension control assembly for a flexible tonneau cover system of a pick-up truck according to claim 1, wherein the number of the engagement holes formed on the front end of the side rail is three or more.

7. The tension control assembly for a flexible tonneau cover system of a pick-up truck according to claim 1, wherein the engagement holes and the oval-shaped hole are formed on a front end of an inward extension plate of the side rail.

8. A tension control assembly for a flexible tonneau cover system of a pick-up truck, being installed between one end of a side rail and one end of a header, and comprising:
   an adjustable engagement plate sandwiched between the header and the side rail, and having a positioning hole and an engagement hook to selectively engage in one of engagement holes formed on the end of the side rail, wherein the engagement hook is formed on a rear edge of the adjustable engagement plate and the positioning hole is formed on a position close to a front edge of the adjustable engagement plate; and
   a screw assembly having a screw member and a nut member, wherein the screw member is formed with a head portion and a thread rod portion, the head portion is slidably installed in a groove of the header, the thread rod portion passes through the positioning hole of the adjustable engagement plate and an oval-shaped hole on the end of the side rail in turn to screw-connect with the nut member, so that a transverse position of the header in relation to a width direction of the side rail is adjusted and stably kept, while the positioning hole of the adjustable engagement plate positions the thread rod portion of the screw assembly according to an engagement relationship between the engagement hook and the engagement holes, so that a longitudinal position of the header in relation to a length direction of the side rail is adjusted and stably kept.

9. The tension control assembly for a flexible tonneau cover system of a pick-up truck according to Claim 8, wherein the engagement hook of the adjustable engagement plate is a bent hook.

10. The tension control assembly for a flexible tonneau cover system of a pick-up truck according to Claim 8, wherein the adjustable engagement plate is a one-piece punched metal plate.

11. The tension control assembly for a flexible tonneau cover system of a pick-up truck according to Claim 8, wherein the adjustable engagement plate includes: a first metal plate having the engagement hook and a narrow-mouth hole; a second metal plate having the positioning hole and an expanded end portion; and a spring inserted in the narrow-mouth hole and biasing against the expanded end portion of the second metal plate.

12. The tension control assembly for a flexible tonneau cover system of a pick-up truck according to Claim 8, wherein the screw assembly further has a washer, wherein the washer is sandwiched between the adjustable engagement plate and the nut member, and the thread rod portion passes through an opening of the washer.

13. The tension control assembly for a flexible tonneau cover system of a pick-up truck according to Claim 8, wherein the number of the engagement holes formed on the end of the side rail is three or more.

14. The tension control assembly for a flexible tonneau cover system of a pick-up truck according to Claim 8, wherein the engagement holes and the oval-shaped hole are formed on a front end of an inward extension plate of the side rail.

* * * * *